United States Patent [19]

Amano

[11] Patent Number: 5,193,096
[45] Date of Patent: Mar. 9, 1993

[54] ACOUSTO-OPTIC Q-SWITCHED SOLID STATE LASER

[75] Inventor: Sho Amano, Hachiouji, Japan

[73] Assignee: Hoya Corporation, Tokyo, Japan

[21] Appl. No.: 801,520

[22] Filed: Dec. 2, 1991

[30] Foreign Application Priority Data

Nov. 30, 1990 [JP] Japan ................. 2-339160

[51] Int. Cl.$^5$ .............................................. H01S 3/117
[52] U.S. Cl. ........................................ 372/13; 372/10; 372/34; 372/70
[58] Field of Search ....................... 372/10, 13, 12, 34, 372/99, 69, 92, 70, 71, 72, 108, 92, 98

[56] References Cited

U.S. PATENT DOCUMENTS

| | | |
|---|---|---|
| 3,828,276 | 8/1974 | Cohen .................... 372/13 |
| 3,896,397 | 7/1975 | de Wit et al. ............ 372/13 |
| 4,630,275 | 12/1986 | Rapoport ................ 372/13 |
| 4,740,986 | 4/1988 | Reeder .................... 372/92 |
| 4,752,931 | 6/1988 | Dutcher ................ 372/10 X |
| 4,761,786 | 8/1988 | Baer ...................... 372/13 X |
| 4,792,930 | 12/1988 | Kobayashi et al. ...... 372/13 X |
| 4,872,181 | 10/1989 | Johnson et al. ......... 372/10 X |
| 4,930,901 | 6/1990 | Johnson et al. ......... 372/10 X |
| 4,965,803 | 10/1990 | Esterowitz et al. ...... 372/13 X |
| 5,132,977 | 7/1992 | Zayhowski et al. ..... 372/10 |

OTHER PUBLICATIONS

Klann et al., "Highly Stable Acousto-Optic Mode-Locking ... ", Optic Comm. vol. 38 No. 5.6 Sep. 1981 pp. 390–392.

Primary Examiner—Brian Healy
Attorney, Agent, or Firm—Oliff & Berridge

[57] ABSTRACT

A Q-switched solid state laser provided with a laser medium, a pump source for generating pumping light used to pump the laser medium, a pair of laser resonance mirrors respectively placed at both sides of the laser medium and a Q-switching acousto-optical element intervening between the pair of laser resonance mirrors for controlling Q-switching oscillation by abruptly changing a loss of resonant laser light passing therethrough. Further, the Q-switching acousto-optical element satisfies a predetermined condition $|Ms| \geq 1 \times 10^{-12} S^3/g.°C$. where Ms denotes a parameter defined as $Ms = M/(ds/dt)$ by letting (ds/dt) designate a thermal change in optical path of the Q-switching acousto-optical element and also letting M represent a performance index of an acousto-optical material of the acousto-optical element. Thereby, the Q-switched solid state laser excels in what is called a "beam pointing stability" and "pulse-to-pulse stability".

20 Claims, 4 Drawing Sheets

FIG. 4

| MEDIUM | PbMoO$_4$ | TeO$_2$ | AOT -5 | AOT -44B | AOT -40 |
|---|---|---|---|---|---|
| REFRACTIVE INDEX n(633nm) | O=2.386 E=2.262 | O=2.260 E=2.412 | 2.090 | 1.971 | 1.942 |
| DENSITY $\rho$ (g/cm$^3$) | 6.95 | 5.90 | 5.87 | 5.06 | 5.20 |
| VELOCITY OF SOUND V(m/s) | 3632 | 4200 | 3470 | 3330 | 3160 |
| dn/dT ($\times 10^{-6}$/°C) | O=-71.7 E=-40.7 | O=21.7 | -7.2 | -8.2 | -21.5 |
| EXPANSION COEFFICIENT $\alpha$ ($\times 10^{-6}$/°C) | $\langle 11 \rangle$=10 $\langle 33 \rangle$=25 | $\langle 11 \rangle$=4.3 $\langle 33 \rangle$=20 | 14.6 | 20.1 | 21.0 |
| PERFORMANCE INDEX M ($\times 10^{-18}$ S$^3$/g) | 36.3 | 34.5 | 23.9 | 20.9 | 19.5 |
| ds/dT ($\times 10^{-6}$/°C) | -37 | 47 | 8.7 | 11.3 | -1.54 |
| M/(ds/dT) ($10^{-12}$ S$^3$/g°C) | -0.981 | 0.734 | 2.747 | 1.850 | -12.66 |

ACOUSTO-OPTIC Q-SWITCHED SOLID STATE LASER

BACKGROUND OF THE INVENTION

1. Field of the Invention

This invention generally relates to a solid state laser and more particularly to a Q-switched solid state laser employing an acousto-optical element for controlling a Q-switch.

2. Description of the Related Art

Generally, it is preferable that a Q-switched solid state laser used in a technical field of micro-processing employed in a semi-conductor manufacturing process or of precision optical metering can generate pulse laser light which excel in a "beam pointing stability" when high peak power is applied to the laser, and also excel in a good "pulse-to-pulse stability". Incidentally, in the instant application, the term "beam pointing stability" is used to represent to what extent beam spots of laser light can stably be formed at the same position. Further, the term "pulse-to-pulse stability" is used to represent to what extent pulses of the same intensity can stably be generated.

A conventional Q-switched solid state laser employed in the technical fields as above described is disclosed in Japanese Unexamined Patent Publication (Kokai Tokkyo Koho) Official Gazette No. 63-168063 (U.S. Pat. No. 4,761,786 Aug. 2, 1988).

As shown in FIG. 2, a front mirror 2 and a rear mirror 3 forming resonance mirrors (i.e., cavity mirrors) of a resonator are respectively placed at both sides of a laser medium 1, which is formed by an Nd:YAG laser rod or an Nd:YLF laser rod, in this conventional Q-switched solid state laser. Further, an acousto-optical element (AOM) 4 for Q-switching is inserted between the laser medium 1 and the front mirror 2. Moreover, converging lenses 5 and a laser diode 6 for generating pumping laser light Lr are placed at the outside of the rear mirror 3 (namely, at the left side of the rear mirror 3 as viewed in this figure) in this order. Incidentally, the front mirror 2 transmits part of resonance laser light L and is used to extract oscillation laser light L' to the outside. Further, the rear mirror 3 transmits almost all of the pumping laser light Lr and performs nearly total reflection of the resonance laser light L.

In the above described conventional laser, the pumping light Lr is converged by the converging lenses 5 and is incident on an end surface of the laser medium 1 to pump the laser medium 1. As the result, the resonance laser light L is generated. At that time, a diffraction grating is caused in the AOM 4 for Q-switching by applying high frequency power to the AOM 4 by means of a drive device (not shown), so that a loss is inflicted on the resonance laser light L. Thus no laser oscillation occurs and pumping energy is stored in the laser medium 1. Under such a condition, if the high frequency power applied to the AOM 4 is suddenly cut off, the diffraction grating disappears and a resonance loss is decreased. As the result, the stored energy is released at a sitting and a laser pulse L' is put out.

The conventional Q-switched solid state laser described above does not need cooling water and a lamp employed as a broad-band pump source because of employing a laser diode as a pump source. Therefore, there is no influence of noises originated from the cooling water and the lamp on the laser. Moreover, there occur hardly thermal problems. Consequently, compared with the conventional laser of the type which employs a lamp as a broad-band pump source, the conventional Q-switched solid state laser described above excels in the "beam pointing stability" and the "pulse-to-pulse stability".

It, however, has turned out that the conventional Q-switched solid state laser does not necessarily have sufficient "beam pointing stability" and "pulse-to-pulse stability" to such an extent as become required recently.

According to the study by Inventor of the instant application, there is a factor affecting the "beam pointing stability" and "pulse-to-pulse stability" of the laser other than the induced noises and the thermal influence owing to the lamp employed as a pump source.

Namely, when high-frequency power is applied to an acousto-optical element for Q-switching, a gentle thermal gradient is caused in the acousto-optical element due to heat generated by the acousto-optical element itself and a connection portion used to connect the acousto-optical element with a lead for supplying power thereto. The thermal gradient gives rise to gradual change of refractive index in the acousto-optical element. As the result, there occur distortion of the wave front of an ultrasonic wave propagating through the acousto-optical element, a positional drift and distortion of the wave front of a transmitted wave. This has bad effects on the "beam pointing stability" and the "pulse-to-pulse stability" of the Q-switched solid state laser. The present invention is accomplished to solve such a problem of the conventional Q-switched solid state laser.

It is, therefore, an object of the present invention to provide a Q-switched solid state laser which excels in oscillation efficiency, the "beam pointing stability" and "pulse-to-pulse stability" and can be formed compactly.

SUMMARY OF THE INVENTION

To achieve the foregoing object, in accordance with an aspect of the present invention, there is provided a Q-switched solid state laser (hereunder sometimes referred to as a first Q-switched solid state laser) which comprises a laser medium, a pump source for generating pumping light used to pump the laser medium, a pair of laser resonance mirrors respectively placed at both sides of the laser medium and a Q-switching acousto-optical element intervening between the pair of laser resonance mirrors for controlling Q-switching oscillation by abruptly changing a loss of resonant laser light passing therethrough. Further, the Q-switching acousto-optical element satisfies the following condition:

$$|Ms| \geq 1 \times 10^{-12} s^3/g \cdot {}^\circ C.$$

where Ms denotes a parameter defined as $$Ms = M/(ds/dT)$$

by letting (ds/dT) designate a thermal change in optical path of the Q-switching acousto-optical element and also letting M represent a performance index of an acousto-optical material of the acousto-optical element, and M known as the acousto-optic figure of merit.

Thus the change in the refractive index owing to the thermal gradient becomes small. As the result, the distortion of the wave front of an ultrasonic wave, the positional drift and the distortion of the wave front of a transmitted wave, which are caused due to the change in the refractive index, become small. Consequently, the Q-switched solid state laser comes to excel in the "beam pointing stability" and the "pulse-to-pulse stability".

Further, in accordance with another aspect of the present invention, there is provided a Q-switched solid state laser (hereunder sometimes referred to as a second Q-switched laser) which comprises a converging optical system for converging laser light to be incident on the Q-switching acousto-optical element in addition to the composing elements of the first Q-switched solid state laser.

Thus the beam of the laser light to be incident on the Q-switching acousto-optical element can be made by the converging optical system to be very thin. As the consequence, high-frequency power applied for Q-switching can be saved. Thereby, a quantity of heat generated in the Q-switched solid state laser can be decreased. Consequently, the effects of the change in the refractive index on the laser beam in the acousto-optical element can be also decreased. Moreover, the "beam pointing stability", as well as the pulse-to-pulse stability", can be improved.

Furthermore, in accordance with further another aspect of the present invention, there is provided a Q-switched solid state laser (hereunder sometimes referred to as a third Q-switched solid state laser) which comprises the composing elements of the second Q-switched solid state laser. However, an end surface of the laser medium facing the Q-switching acousto-optical element is formed like a convex lens.

Thus there is no necessity of providing another lens means in the Q-switched solid state laser as another converging optical system. Thereby, the structure of the Q-switched solid state laser can be simplified. Namely, the Q-switched solid state laser can be made compact.

Further, in accordance with still another aspect of the present invention, there is provided a Q-switched solid state laser (hereunder sometimes referred to as a fourth Q-switched solid state laser) which comprises the composing elements of the first, second or third Q-switched solid state laser and a heat radiating means is provided in the Q-switching acousto-optical element.

Thus the rise of temperature of the Q-switched acousto-optical element can be reduced. Thereby, the thermal gradient caused in the element can be made to be gentler.

Moreover, in accordance with yet another aspect of the present invention, there is provided a Q-switched solid state laser (hereunder sometimes referred to as a fifth Q-switched solid state laser) which comprises the composing elements of the first, second, third or fourth Q-switched solid state laser and employs a laser diode or a laser-diode array as the pump source.

Thus the induced noises and the thermal problem in case of the conventional laser employing the lamp as the pump source can be eliminated. Thereby, the present invention can effectively be applied to practical use.

Additionally, in accordance with a still further aspect of the present invention, there is provided a Q-switched solid state laser which comprises the composing elements of the first, second, third, fourth or fifth Q-switched solid state laser and employs a medium made of a crystal of $YAG(Y_3Al_5O_{12})$, $YAlO_3$, $Al_2O_3$, YLF-($LiYF_4$), $GSGG(Gd_3Sc_3Al_3O_{12})$, $GSAG(Gd_3Sc_3Al_3O_{12})$, $GGG(Gd_3Ga_5O_{12})$, $YVO_4$, $LaF_3$, $BeAl_2O_4$ or $BaY_2F_8$, $YAl_3(BO_3)_4$, $Al_3(BO_3)_4$ or glass, which is doped with at least one of rare earth ions including Nd, Er, Ho, Tm, Tr, Pr, Cr and Ti.

Thereby, various pulse laser light which excels in the "beam pointing stability" and the "pulse-to-pulse stability" can be obtained.

BRIEF DESCRIPTION OF THE DRAWINGS

Other features, objects and advantages of the present invention will become apparent from the following description of preferred embodiments with reference to the drawings in which like reference characters designate like or corresponding parts throughout several views, and in which:

FIG. 4 is a diagram for illustrating physical properties of acoustic-optical elements employed in the embodiments of the present invention.

DETAILED DESCRIPTION OF THE PREFERRED EMBODIMENTS

Hereinafter, preferred embodiments of the present invention will be described in detail by referring to the accompanying drawings.

Figure 1:
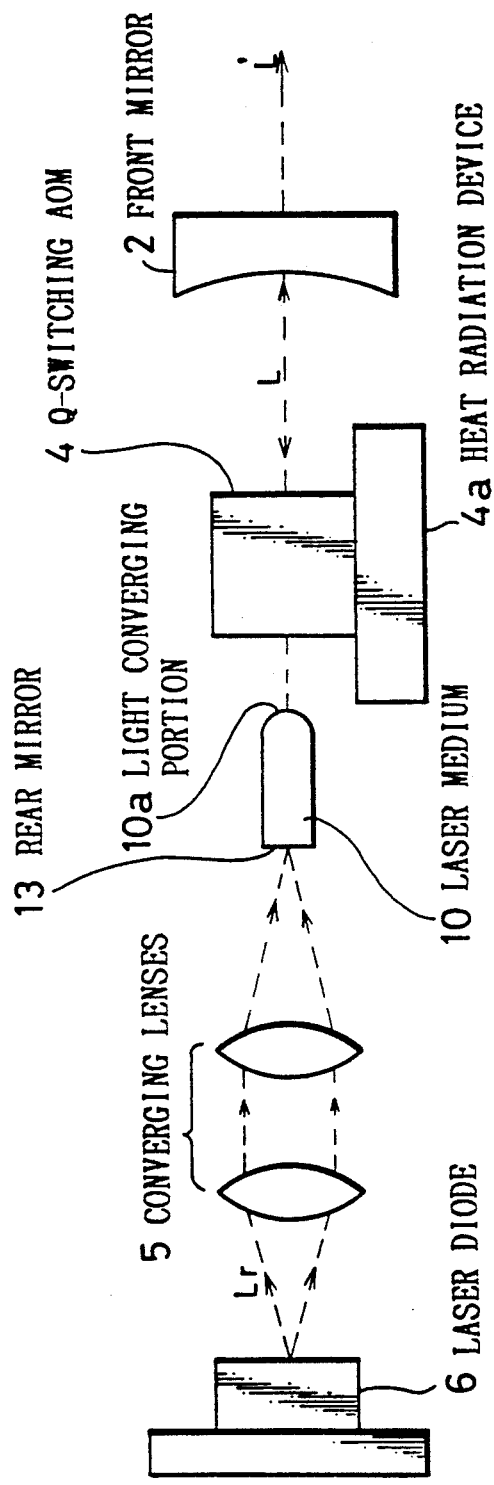
FIG. 1 is a schematic diagram for illustrating the construction of a Q-switched solid state laser (hereunder sometimes referred to as a first embodiment) embodying the present invention.

Referring first to FIG. 1, there is shown a Q-switched solid state laser (namely, the first embodiment) embodying the present invention. Incidentally, in this figure, like reference characters designate like composing portions of the conventional Q-switched solid state laser of FIG. 2. Thus, the descriptions of such composing portions are omitted, and only characteristic portions of the first embodiment will mainly be described hereinbelow.

Figure 2:
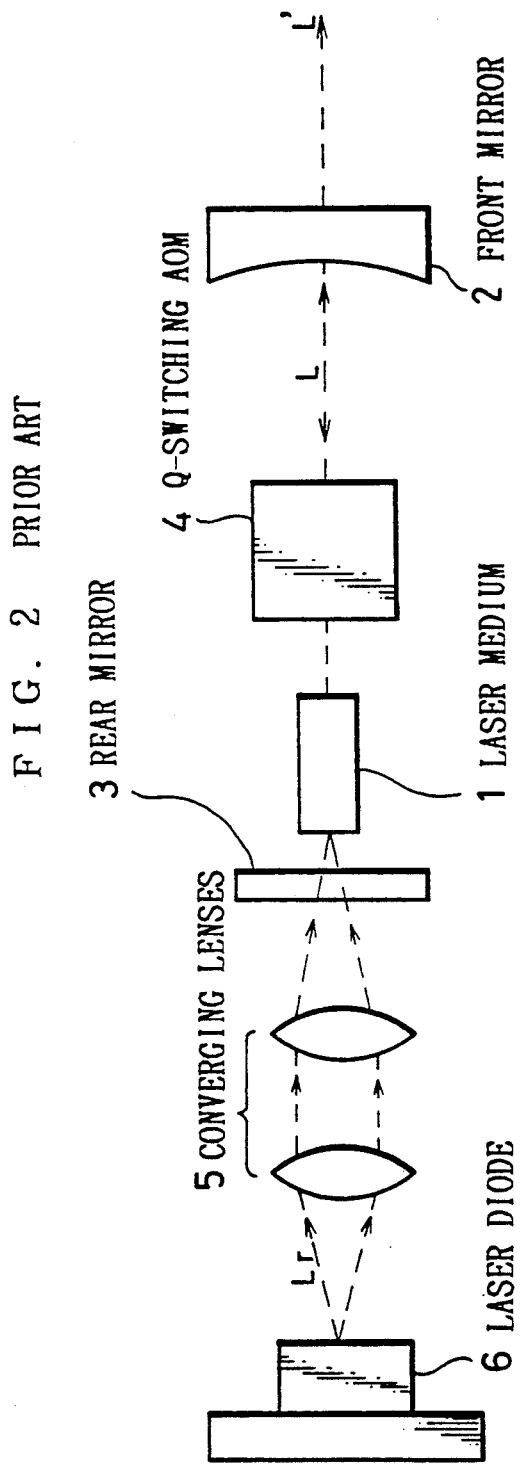
FIG. 2 is a schematic diagram for illustrating the construction of a conventional Q-switched solid state laser.

This embodiment is different in construction from the conventional laser of FIG. 2 in the following respects. Namely, a laser medium 10 is employed instead of the laser medium 1 of the conventional laser. Further, an end surface in the longitudinal direction of the laser medium 10 is formed like a convex lens as a light converging portion 10a. Moreover, a rear mirror 13 made of a thin film is formed the other end surface of the laser medium 10. Furthermore, an acousto-optical element which satisfies a predetermined condition (to be described later in detail) is employed as a Q-switching AOM 4. Additionally, a heat radiation device 4a is provided in the Q-switching AOM 4. In the other respects, the construction of the first embodiment is similar to that of the conventional laser of FIG. 2.

The laser medium 10 is a Nd:YAG laser rod which is approximately 3 millimeters (mm) in diameter and is nearly 5 mm in length. Further, as viewed in FIG. 1, a right end surface of the laser medium 10 is formed like a convex surface, of which the radius of curvature is about 5 mm, as the light converging portion 10a which forms a converging optical system of the first embodiment of the present invention and is operative to decrease the diameter of a laser beam L to be incident on the Q-switching AOM 4. In contrast, the other end surface of the laser medium 10 (namely, a left end surface of the laser medium 10 as viewed in this figure), is coated with the rear mirror 13 made of an optical thin film which has large reflection coefficient or reflectivity regarding resonant laser light L and large transmittance or transmittivity regarding pumping laser light Lr. Incidentally, the surface of the converging portion 10a is coated with a anti-reflective material which does not reflect the resonant laser light L.

A front mirror 2 has transmittance of about 3% regarding the resonant laser light L. Thus oscillation laser light L' is drawn from the front mirror 2. The front mirror 2 and the rear mirror 13 constitute a laser resonator. Further, it is preferable for decreasing a pulse width of output pulse laser light that the length of the resonator is as short as possible. Thus, in this embodiment, the distance between the front mirror 2 and the rear mirror 13 is set to be about 25 mm.

The laser diode 6 is adapted to generate and emit pumping laser light, the wavelength of which is 807 nano-meters, at a rated output of 0.5 watts (W). Further, a regular temperature of the laser diode 6 is maintained by a temperature control device (not shown) for stabilization of the wavelength of the pumping laser light.

The pumping laser light Lr emitted from this laser diode 6 is converged by the converging lenses 5 in such a manner that the spread of the converged pumping laser light agrees with the extent of the mode volume of the oscillation laser light emitted from the laser medium 10.

As the Q-switching AOM 4, an acousto-optical element satisfying the following condition (1) is employed. Namely, let (ds/dT) designate a thermal change in optical path of the Q-switching acousto-optical element, and further let M represent a performance index of an acousto-optical material of the acousto-optical element. Here, a parameter Ms is defined as follows:

$$Ms = M/(ds/dT).$$

The condition which should be met by the acousto-optical element is as follows:

$$|Ms| \geq 1 \times 10^{-12} s^3/g \cdot {}^\circ C. \quad (1)$$

Incidentally, the performance index of the acousto-optical material and the thermal change in optical path of the Q-switching acousto-optical element are given as follows:

$$M = n^6 p^2/(\rho v^3)$$

$$(ds/dT) = (dn/dT) + (n-1)\alpha$$

where n denotes the refractive index of the acousto-optical material; p the photo-elastic constant thereof; $\rho$ the density thereof; v the velocity of sound; $\alpha$ the coefficient of linear expansion of the acousto-optical material; and (dn/dT) thermal change in the refractive index thereof. Thus the value of the parameter Ms is characteristic of the acousto-optical material.

Examples of an acousto-optical element satisfying such a condition are AOT-5, AOT-44B and AOT-40 ("AOT-5", "AOT-44B" and "AOT-40" are manufactured by HOYA Corporation) which are made of Te glass. In FIG. 4, the physical properties of such acousto-optical elements, as well as those of $PbMoO_4$ and $TeO_2$ which are generally used as a material of a Q-switching AOM, are listed for reference.

The heat radiation device 4a is provided in the Q-switching AOM 4 to thereby prevent the rise of the temperature of the AOM 4. Commonly, an air-cooling fan is employed as the heat radiation device 4a. Further, for the purpose of increasing heat radiation effects, an electronic cooling device such as a Peltier element is sometimes employed as the heat radiation device 4a.

According to the result of an experiment of oscillation made by using the first embodiment, output light, of which the wavelength is 1064 nm and the pulse width is 35 nano-second (ns) and the pulse energy is 10 microjoules (μJ), is obtained when the pulse rate is 1 kilohertz (KHz), as the oscillation laser light L'. The "beam pointing stability" is on the order of about 1% of an expansion angle (or angular divergence), which is diffraction limit. Further, the "pulse-to-pulse stability" is 1% or so. Thus the first embodiment excels in the "beam pointing stability" and the "pulse-to-pulse stability" very much.

Additionally, in case of this embodiment, the laser medium 10 is coated with the rear mirror 4. Further, the light converging portion 10a is formed in the laser medium 10 as a converging optical system. Thereby, this embodiment further has an advantage in that the laser can be formed compactly.

Figure 3:
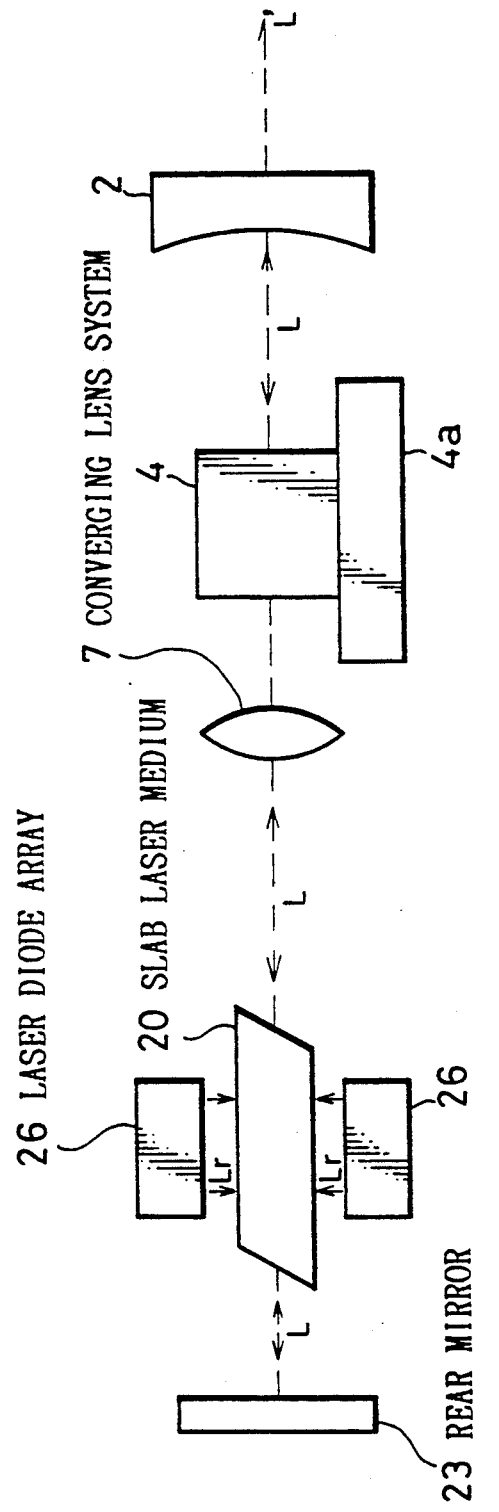
FIG. 3 is a schematic diagram for illustrating the construction of another Q-switched solid state laser (hereunder sometimes referred to as a second embodiment) embodying the present invention.

Referring next to FIG. 3, there is shown the construction of another Q-switched solid state laser embodying the present invention (namely, the second embodiment of the present invention). Hereinafter, the second embodiment will be described in detail by referring to FIG. 3. Incidentally, in case of the second embodiment, a slab laser medium 20 is employed instead of the laser medium 10 and is pumped or excited at the side thereof by a laser diode array 26. Thus there are portions in common between the first and second embodiments. In FIG. 3, like reference characters designate the common portions. Further, the descriptions of such composing portions of the omitted, and only characteristic portions of the second embodiment will mainly be described hereinbelow.

As shown in FIG. 3, in case of the second embodiment, a slab laser medium 20, a converging lens system 7 and a Q-switching AOM 4 are placed between a front mirror 2 and a rear mirror 23 in this order in such a fashion to have a common optical axis. Incidentally, the Q-switching AOM 4, a heat radiation device 4a and the front mirror 2 are the same as of the first embodiment. Thus the descriptions of these composing elements are omitted herein.

The rear mirror 23 of the second embodiment is a total reflection mirror, and the rear mirror 23 and the front 2 constitutes a laser resonator.

The slab laser medium 20 is a Nd:YAG laser medium formed like a parallelopiped, of which the end surfaces in the longitudinal direction are parallel with each other and are inclined at the same angle to the longitudinal direction and the top and bottom surfaces are parallel with each other. Further, laser light follows a zig-zag optical path in the slab 1; a laser medium 20 undergoing total inner reflection at the top and bottom surfaces thereof and is incident on one of the end surfaces facing in the longitudinal direction thereof and is emitted from the other of the end surfaces in the same direction thereof.

Furthermore, a laser diode array 26 is placed at a position facing each of the top and bottom surfaces of the slab laser medium 20. The laser diode arrays 26 are adapted to emit the pulse pumping laser light Lr, of which the output energy is 5 mJ and the pulse width is 200 μs, to the top and bottom surfaces of the slab laser medium 20 to pump or excite the medium 20.

The converging lens system 7 is used to reduce the influence of a change of the refractive index in the AOM 4 by decreasing a beam diameter of laser light L and making the laser light L impinge on the Q-switching AOM 4.

According to the result of an experiment of oscillation made by using the second embodiment, output light, of which the wavelength is 1064 nm and the pulse width is 20 ns and the pulse output energy is 200 µJ, is obtained when the pulse rate is 20 Hz, as the oscillation laser light L'. The "beam pointing stability" is on the order of about 1% of an expansion angle, which is diffraction limit. Further, the "pulse-to-pulse stability" is 1% or so. Thus the second embodiment also excels in the "beam pointing stability" and the "pulse-to-pulse stability" very much. Namely, pulse laser light having high output energy and high stability can be obtained.

While preferred embodiments of the present invention have been described above, it is to be understood that the present invention is not limited thereto and that other modifications will be apparent to those skilled in the art without departing from the spirit of the invention.

For instance, in each of the first and second embodiments, a laser diode is employed as a pump source. Another laser, however, may be employed as the pump source. Further, it is confirmed that even in case where a lamp is employed as the pump source, regular effects can be obtained. Moreover, in case where a laser medium is pumped or excited by pumping laser light which is incident on one of end surfaces in the longitudinal direction of the laser medium, an aspherical lens, a pair of prisms, a gradient index lens, an optical fiber or a bundle of optical fibers, which have the same effects as the converging lenses have, may be used for leading the pumping light to the laser medium in place of the converging lens used for making the pumping light agree with a laser oscillation mode. In such a case, an asymmetric laser beam can be changed into symmetrical one by employing a pair of prisms, an optical fiber or a bundle of optical fibers.

Additionally, a laser medium made of a crystal of YAG($Y_3Al_5O_{12}$), YAlO$_3$, Al$_2$O$_3$, YLF(liYF$_4$), GSGG(Gd$_3$Sc$_3$Al$_3$O$_{12}$), GSAG(Gd$_3$Sc$_3$Al$_3$O$_{12}$), GGG(Gd$_3$Ga$_5$O$_{12}$), YVO$_4$, LaF$_3$, BeAl$_2$O$_4$ or BaY$_2$F$_8$ YAl$_3$(BO$_3$)$_4$, Al$_3$(BO$_3$)$_4$ or glass, which is doped with at least one of rare earth ions including Nd, Er, Ho, Tm, Tr, Pr, Cr and Ti, may be employed instead of the Nd:YAG laser medium. Thereby, extremely-stable pulse laser light of various wavelength can be obtained.

The scope of the present invention, therefore, is to be determined solely by the appended claims.

What is claimed is:

1. A Q-switched solid state laser comprising:
   a laser medium;
   a pump source for generating pumping light used to pump the laser medium;
   a pair of laser resonance mirrors respectively placed at both sides of the laser medium; and
   a Q-switching acousto-optical element intervening between the pair of laser resonance mirrors for controlling Q-switching oscillation by abruptly changing a loss of resonant laser light passing therethrough, the Q-switching acousto-optical element satisfying a condition given by $$|Ms| \geq 1 \times 10^{-12} s^3/g \cdot °C.$$

where Ms denotes a parameter defined as $$Ms = M/(ds/dT)$$

by letting (ds/dT) designate a thermal change in optical path of the Q-switching acousto-optical element and letting M represent a performance index of an acousto-optical material of the acousto-optical element.

2. The Q-switched solid state laser as set forth in claim 1, further comprising a converging optical system for converging laser light to be incident on the Q-switching acousto-optical element.

3. The Q-switched solid state laser as set forth in claim 2, wherein an end surface of the laser medium facing the Q-switching acousto-optical element is formed like a convex lens.

4. The Q-switched solid state laser as set forth in claim 1, further comprising a heat radiating means is provided in the Q-switching acousto-optical element.

5. The Q-switched solid state laser as set forth in claim 1, wherein the pump source is a laser diode.

6. The Q-switched solid state laser as set forth in claim 1, wherein the pump source is a laser-diode array.

7. The Q-switched solid state laser as set forth in claim 1, wherein the laser medium is a medium made of a crystal of YAG($Y_3Al_5O_{12}$), which is doped with at least one of rare earth ions including Nd, Er, Ho, Tm, Tr, Pr, Cr, and Ti.

8. The Q-switched solid state laser as set forth in claim 1, wherein the laser medium is a medium made of a crystal of YAlO$_3$, which is doped with at least one of rare earth ions including Nd, Er, Ho, Tm, Tr, Pr, Cr, and Ti.

9. The Q-switched solid state laser as set forth in claim 1, wherein the laser medium is a medium made of a crystal of Al$_2$O$_3$, which is doped with at least one of rare earth ions including Nd, Er, Ho, Tm, Tr, Pr, Cr and Ti.

10. The Q-switched solid state laser as set forth in claim 1, wherein the laser medium is a medium made of a crystal of YLF(liYF$_4$), which is doped with at least one of rare earth ions including Nd, Er, Ho, Tm, Tr, Pr, Cr and Ti.

11. The Q-switched solid state laser as set forth in claim 1, wherein the laser medium is a medium made of a crystal of GSGG(Gd$_3$Sc$_3$Al$_3$O$_{12}$), which is doped with at least one of rare earth ions including Nd, Er, Ho, Tm, Tr, Pr, Cr and Ti.

12. The Q-switched solid state laser as set forth in claim 1, wherein the laser medium is a medium made of a crystal of GSAG(Gd$_3$Sc$_3$Al$_3$O$_{12}$), which is doped with at least one of rare earth ions including Nd, Er, Ho, Tm, Tr, Pr, Cr and Ti.

13. The Q-switched solid state laser as set forth in claim 1, wherein the laser medium is a medium made of a crystal of GGG(Gd$_3$Ga$_5$O$_{12}$), which is doped with at least one of rare earth ions including Nd, Er, Ho, Tm, Tr, Pr, Cr and Ti.

14. The Q-switched solid state laser as set forth in claim 1, wherein the laser medium is a medium made of a crystal of YVO$_4$, which is doped with at least one of rare earth ions including Nd, Er, Ho, Tm, Tr, Pr, Cr and Ti.

15. The Q-switched solid state laser as set forth in claim 1, wherein the laser medium is a medium made of a crystal of LaF$_3$, which is doped with at least one of rare earth ions including Nd, Er, Ho, Tm, Tr, Pr, Cr and Ti.

16. The Q-switched solid state laser as set forth in claim 1, wherein the laser medium is a medium made of a crystal of $BeAl_2O_4$, which is doped with at least one of rare earth ions including Nd, Er, Ho, Tm, Tr, Pr, Cr and Ti.

17. The Q-switched solid state laser as set forth in claim 1, wherein the laser medium is a medium made of a crystal of $BaY_2F_8$, which is doped with at least one of rare earth ions including Nd, Er, Ho, Tm, Tr, Pr, Cr and Ti.

18. The Q-switched solid laser as set forth in claim 1, wherein the laser medium is a medium made of $YAl_3(BO_3)_4$, which is doped with at least one of rare earth ions including Nd, Er, Ho, Tm, Tr, Pr, Cr and Ti.

19. The Q-switched solid laser as set forth in claim 1, wherein the laser medium is a medium made of $Al_3(BO_3)_4$, Which doped with at least one of rare earth ions including Nd, Er, Ho, Tm, Tr, Pr, Cr and Ti.

20. The Q-switched solid state laser as set forth in claim 1, wherein the laser medium is a medium made of glass, which is doped with at least one of rare earth ions including Nd, Er, Ho, Tm, Tr, Pr, Cr and Ti.

* * * * *